United States Patent [19]

Jakob et al.

[11] Patent Number: 5,266,662

[45] Date of Patent: Nov. 30, 1993

[54] THERMOSETTING REACTION MIXTURES, PROCESS FOR THEIR PRODUCTION AND THE USE THEREOF FOR PRODUCTION OF MOLDINGS AND MOLDING MATERIAL

[75] Inventors: Hans-Dieter Jakob, Leverkusen, Fed. Rep. of Germany; Joachim Franke, Pittsburgh, Pa.; Hanns-Peter Müller, Odenthal-Höffe; Lutz Schrader, Krefeld, both of Fed. Rep. of Germany

[73] Assignee: Bayer Aktiengesellschaft, Leverkusen, Fed. Rep. of Germany

[21] Appl. No.: 941,457

[22] Filed: Sep. 8, 1992

[30] Foreign Application Priority Data

Sep. 12, 1991 [DE] Fed. Rep. of Germany ....... 4130329

[51] Int. Cl.$^5$ .................... C08F 283/10; C08G 59/18; C08L 63/06

[52] U.S. Cl. .................................... 525/528; 528/51; 528/53

[58] Field of Search ...................... 525/528; 528/51, 53

[56] References Cited

U.S. PATENT DOCUMENTS

| | | | |
|---|---|---|---|
| 4,131,600 | 12/1978 | Ihlein et al. | 528/53 |
| 4,562,227 | 12/1985 | Rogler et al. | 524/786 |
| 4,564,651 | 1/1986 | Markert et al. | 524/589 |
| 4,582,723 | 4/1986 | Markert et al. | 427/116 |
| 4,631,306 | 12/1986 | Markert et al. | 523/457 |
| 4,728,676 | 3/1988 | Muller et al. | 525/456 |
| 4,788,224 | 11/1988 | Müller et al. | 521/104 |
| 5,084,544 | 1/1992 | Müller et al. | 528/73 |

Primary Examiner—Melvyn I. Marquis
Assistant Examiner—D. Aylward
Attorney, Agent, or Firm—Joseph C. Gil; N. Denise Brown

[57] ABSTRACT

It is now possible to provide reaction resin mixtures based on organic polyisocyanates and organic polyepoxides that can be hot-cured to high-quality plastics having isocyanurate and oxazolidinone groups that are largely storage-stable at room temperature, without their curing having to be stopped at any time, so that the systems exist in an intermediate "B-stage" (i.e., in a state that is solid at ambient or moderately elevated temperature but still fusible), so that at any later time, for example after pulverizing or dissolving in a suitable solvent, they can be converted by shaping and further thermal action to their ultimate, crosslinked and no longer fusible final state.

4 Claims, No Drawings

5,266,662

THERMOSETTING REACTION MIXTURES, PROCESS FOR THEIR PRODUCTION AND THE USE THEREOF FOR PRODUCTION OF MOLDINGS AND MOLDING MATERIAL

BACKGROUND OF THE INVENTION

The present invention relates to reaction mixtures of organic polyisocyanates, organic polyepoxides and special catalysts that are curable by the action of heat to plastics having isocyanurate and oxazolidinone groups.

Plastics having isocyanurate and oxazolidinone groups are known. They are produced by polyaddition of polyfunctional 1,2-epoxides with polyisocyanates and use of curing catalysts. See, e.g., German Offenlegungsschrift 3,323,153 (believed to correspond to U.S. Pat. No. 4,582,723), European Patent 130,454 (believed to correspond to U.S. Pat. No. 4,564,651), German Offenlegungsschrift 3,323,084 (believed to correspond to U.S. Pat. No. 4,631,306) and German Offenlegungsschrift 3,323,123 (believed to correspond to U.S. Pat. No. 4,562,227). Tertiary amines and imidazoles as well as onium salts and Lewis salts, for example, are suitable catalysts.

German Offenlegungsschrift 3,904,156 (believed to correspond to U.S. Pat. No. 5,084,544) describes the polyaddition of these materials with tertiary amines at room temperature, which leads to dimensionally stable plastics. These materials have a low solubility e.g. in MEK and are no longer fusible, which is an indication that the reaction has progressed beyond the so-called B-stage.

For many fields of technical application, there is a desire for this B-stage, in which the material is a still sufficiently reactive solid that, being grindable, fusible and soluble, covers a wide field of application.

It was the problem of the present invention to produce, in a technically simple way, a solid resin in the B-stage in storage-proof form from the liquid starting compounds.

German Offenlegungsschrift 3,323,123 describes how this B-stage is obtained by thermal initiation of the catalyzed polyaddition. On reaching the B-stage, this polyaddition is stopped by addition of a catalyst poison.

DESCRIPTION OF THE INVENTION

Surprisingly, it has now been discovered that with addition of the catalysts described in German Offenlegungsschrift 3,904,156, the reaction proceeds to a small degree at room temperature and remains in the B-stage without the requirement of adding a catalyst poison.

It is consequently possible to provide reaction resin mixtures based on organic polyisocyanates and organic polyepoxides that can be hot-cured to high-quality plastics having isocyanurate and oxazolidinone groups that are largely storage-stable at room temperature, without their curing having to be stopped at any time, so that the systems exist in an intermediate "B-stage" (i.e., in a state that is solid at ambient or moderately elevated temperature but still fusible), so that at any later time, for example after pulverizing or dissolving in a suitable solvent, they can be converted by shaping and further thermal action to their ultimate, crosslinked and no longer fusible final state.

The above-problem has been solved by providing reaction resin mixtures according to the invention, described in more detail below, that are characterized by the presence of a combination of non-latent and of quite specific latent catalysts.

The present invention is accordingly directed to a thermosetting reaction resin mixture prepared by reacting
  a) at least one organic polyisocyanate, with
  b) at least one organic compound, containing at least two epoxide groups, in an amount corresponding to an equivalent ratio of isocyanate groups to epoxide groups of from 1.2:1 to 70:1, in the presence of
  c) a catalyst mixture consisting of
    c1) from 0.1 to 1.0% by weight based on the weight of the total mixture of a non-latent catalyst which is a tertiary amine, and
    c2) a thermally latent catalyst selected from the group consisting of i) tertiary or quaternary ammonium salts formed from acid esters of organic phosphonic acids or phosphoric acid, said esters being active in alkylation, and ii) boron trihalide-tertiary amine complexes, and
  d) optionally, further processing aids and additives, characterized in that the combination of the two catalysts c1) and c2) gives rise to a B-stage resin that i) is solid and storage-stable at room temperature and ii) can be converted at any time into a final crosslinked state by the application of heat.

The expert had to expect that a combination of the two catalysts c1) and c2) would cause the polymerization to proceed beyond the B-stage so that no soluble, fusible and grindable resins would be formed. This is the teaching from German Offenlegungsschrift 3,904,156, in which it is described that the use of sterically hindered catalysts leads to reaction resins whose viscosity at room temperature does not immediately change but that nevertheless gel in short times at room temperature to dimensionally stable plastics. The reaction described in German Offenlegungsschrift 3,904,156 accordingly goes beyond the B-stage.

It is known from German Offenlegungsschrift 3,644,382 (believed to correspond to U.S. Pat. No. 4,788,224) that to produce a storage-stable B-stage from the reaction resin mixtures a) and b) and tertiary amines, stoppers of the alkylating agent type must be used. Surprisingly, it has now been found that with the process according to the invention the use of stoppers can be dispensed with and storage-stable resins of the B-stage are nevertheless obtained which at any later time can be dissolved, melted or ground by the processor and optionally after addition of processing aids and additives can be cured to the finally crosslinked materials.

It is especially advantageous that the low-viscosity liquid resin mixture can, in conventional plants, be mixed with fillers, colorants and other additives and after adding catalyst converted to the storage-stable B-stage desired by the processor.

Since the reaction of the liquid stage into the gelled B-stage proceeds slowly and with low exothermicity, the formulated liquid resin mixture can, even on the technical scale, be drawn off into special drums, in which the liquid resin solidifies to the solid B-stage. This kind of formulation of e.g. molding materials, saves the user several formulation steps that otherwise follow subsequently.

The component a) of the mixture according to the invention is any organic polyisocyanate of the kind generally known from polyurethane chemistry. Suitable compounds include, for example, aliphatic, cycloaliphatic, araliphatic, aromatic and heterocyclic polyisocyanates such as are described by W. Siefken in Justus Liebigs Annalen der Chemie, 562, pages 75 to 136, for example those of formula

wherein n=2 to 4, and preferably 2 and
Q signifies a group selected from the group consisting of
i) an aliphatic hydrocarbon group with from 2 to 18, and preferably 6 to 10, carbon atoms, ii) a cycloaliphatic hydrocarbon group with from 4 to 15, and preferably 5 to 10, carbon atoms atoms, iii) an aromatic hydrocarbon group with from 6 to 15, and preferably 6 to 13, carbon atoms, and iv) an araliphatic hydrocarbon group with from 8 to 15, and preferably 8 to 13, carbon atoms.

Specific examples of useful isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate as well as mixtures of these isomers; 1-isocyanato-3,3,5-trimethyl-5-isocyanatomethylcyclohexane (see, e.g. German Auslegeschrift 1,202,785 and U.S. Pat. No. 3,401,190); 2,4- and 2,6-hexahydrotolylene diisocyanate as well as mixtures of these isomers; hexahydro-1,3- and/or -1,4-phenylenediisocyanate; perhydro-2,4'- and/or -4,4'-diphenylmethanediisocyanate; 1,3-and 1,4-phenylenediisocyanate; 2,4- and 2,6-tolylenediisocyanate as well as mixtures of these isomers; diphenylmethane-2,4'-and/or-4,4'-diisocyanate; and naphthalene-1,5-diisocyanate.

The following isocyanates are also suitable: triphenylmethane-4,4',4''-triisocyanate; polyphenylpolymethylene polyisocyanates as obtained by aniline-formaldehyde condensation and subsequent phosgenation (see, e.g., British Patents 874,430 and 848,671); m- and p-isocyanatophenylsulphonyl isocyanates (see U.S. Pat. No. 3,454,606); perchlorinated aryl polyisocyanates (U.S. Pat. No. 3,277,138); polyisocyanates having carbodiimide groups (U.S. Pat. No. 3,152,162); norbornane diisocyanates (U.S. Pat. No. 3,492,330); polyisocyanates having allophanate groups (British Patent 994,890); polyisocyanates having isocyanurate groups (U.S. Pat. No. 3,001,973); polyisocyanates having urethane groups (U.S. Pat. Nos. 3,394,164 and 3,644,457); polyisocyanates having acylated urea groups (German Patent 1,230,778); polyisocyanates having biuret groups (U.S. Pat. Nos. 3,124,605 and 3,201,372); polyisocyanates produced by telomerization reactions (U.S. Pat. No. 3,654,106); polyisocyanates having ester groups (U.S. Pat. No. 3,567,763); reaction products of the aforementioned isocyanates with acetals (German Patent 1,072,385); and polymeric fatty acid-containing polyisocyanates (U.S. Pat. No. 3,455,883).

It is also possible to use the distillation residues arising in the commercial production of isocyanates and having isocyanate groups, optionally dissolved in one or several of the aforementioned polyisocyanates. It is furthermore possible to use any mixtures of the aforementioned polyisocyanates.

The polyisocyanates that are commercially available are usually preferred, e.g. 2,4- and 2,6-tolylene diisocyanate as well as any mixtures of these isomers ("TDI"); polyphenylpolymethylene polyisocyanates as prepared by aniline-formaldehyde condensation and subsequent phosgenation ("crude MDI"); and polyisocyanates having carbodiimide groups, urethane groups, allophanate groups, isocyanurate groups, urea groups or biuret groups ("modified polyisocyanates"), especially such modified polyisocyanates as are derived from 2,4- and/or 2,6-tolylene diisocyanate or from 4,4'- and/or 2,4'-diphenylmethane diisocyanate.

Especially preferred is a mixture of isomers and/or of homologues of polyisocyanates of the diphenylmethane series with a content of 2,4'-diisocyanatodiphenylmethane of more than 20 wt %. These are polyisocyanate mixtures of the diphenylmethane series with a content of 2,4'-diisocyanatodiphenylmethane of more than 20 wt %, preferably of 30 to 70 wt %. Besides these 2,4'-isomers, the especially preferred polyisocyanate component generally contains other isomeric or homologous polyisocyanates of the diphenylmethane series. This means that the especially preferred polyisocyanate component is generally either a mixture of 2,4'-diisocyanatodiphenylmethane with 4,4'-diisocyanatodiphenylmethane and optionally 0 to 20 wt %, relative to the total mixture, of 2,2'-diisocyanatodiphenylmethane or a mixture of these isomers with polynuclear polyphenylpolymethylene polyisocyanates. In the last-mentioned mixtures, a content of 10 to 60 wt %, relative to the total mixture, of such polynuclear polyisocyanates is generally present. The diisocyanate component enriched in 2,4'-isomers first mentioned as a polyisocyanate component preferably suitable for use can be obtained for example by distilling off a diisocyanate mixture of the indicated composition from a polyisocyanate mixture as obtained by phosgenation of aniline/formaldehyde condensates. The likewise especially suitable mixture containing polynuclear polyisocyanates can be obtained for example by back-mixing of the last-mentioned distillation product with phosgenation product depleted in 4,4'-diisocyanatodiphenylmethane, for example, as described in German Auslegeschrift 1,923,214. It is also possible to obtain such a mixture, i.e. a polyisocyanate mixture whose content of 2,4'-diisocyanatodiphenylmethane corresponds to the given range, directly by appropriate control of the aniline/formaldehyde condensation. U.S. Pat. No. 3,277,173 describes, for example, a route to polyamine mixtures of the diphenylmethane series with a high content of 2,4'-diaminodiphenylmethane. By phosgenation of these condensates rich in 2,4'-diaminodiphenylmethane, the polyisocyanates especially preferred for use can then be obtained directly. Routes to such polyisocyanate mixtures are also indicated in German Offenlegungsschrift 1,937,685 as well as in U.S. Pat. No. 3,362,979. Also in the especially suitable polyisocyanate mixtures, which contain polynuclear polyisocyanates of the diphenylmethane series, the content of 2,4'-diisocyanatodiphenylmethane relative to the total mixture exceeds 20 wt %.

Component b) can be any aliphatic, cycloaliphatic, aromatic or heterocyclic compound containing at least two epoxide groups, i.e. 1,2-epoxide groups. The polyepoxides preferably suitable as component b) have from 2 to 4, and preferably 2, epoxide groups per molecule and an epoxide equivalent weight of from 90 to 500, and preferably 170 to 220. Suitable polyepoxides include, for example, polyglycidyl ethers of polyhydric phenols such as, for example, catechol, resorcinol, hydroquinone, 4,4'-dihydroxydiphenylmethane, 4,4'-dihydroxy-3,3'-dimethyldiphenylmethane, 4,4'-dihydroxydiphenylmethane, 4,4'-dihydroxydiphenylcyclohexane, 4,4'-dihydroxy-3,3'-dimethyldiphenylpropane, 4,4'-dihydroxydiphenyl, 4,4'-dihydroxydiphenylsulphone, tris(4-hydroxyphenyl)methane, the chlorination and bromination products of the aforementioned diphenols, novolaks (that is from reaction products of mono- or polyhydric phenols with aldehydes, especially formaldehyde, in presence of acidic catalysts), diphenols that have been obtained by esterification of 2 moles of the sodium salt of an aromatic hydroxycarboxylic acid with one mole of a dihalogenoalkane or dihalogenodialkyl ether (cf. British Patent 1,017,612) or polyphenols that have been obtained by condensation of phenols and long-chain halogenoparaffins containing at least two halogen atoms (cf. British Patent 1,024,288). Furthermore there should be mentioned: polyepoxide compounds based on aromatic amines and epichlorohydrin, e.g. N-di-(2,3-epoxypropyl)aniline, N,N'-dimethyl-N,N'-diepoxypropyl-4,4'-diaminodiphenylmethane, N-diepoxypropyl-4-aminophenylglycidyl ether (cf. British Patents 772,830 and 816,923).

Further suitable compounds include: glycidyl esters of aromatic, aliphatic and cycloaliphatic polycarboxylic acids, for example, phthalic acid diglycidyl ester, adipic acid diglycidyl ester and glycidyl esters of reaction products from 1 mole of an aromatic or cycloaliphatic dicarboxylic acid anhydride and ½ mole of a diol or 1/n mole of a polyol with n hydroxyl groups or hexahydrophthalic acid diglycidyl ester, all of which can optionally be substituted with methyl groups.

Glycidyl ethers of polyhydric alcohols, for example of 1,4-butanediol, 1,4-butenediol, glycerol, trimethylolpropane, pentaerythritol and poly(ethylene glycol)s can likewise be used. Furthermore of interest are triglycidyl isocyanurate, N,N'-diepoxypropyloxamide,- polyglycidyl thioethers from polythiols (e.g., from bismercaptomethylbenzene), diglycidyltrimethylenetrisulphone and polyglycidyl ethers based on hydantoins.

Finally, epoxidation products of polyunsaturated compounds should be mentioned, such as vegetable oils and their conversion products, epoxidation products of di- and polyolefins such as butadiene, vinylcyclohexene, 1,5-cyclooctadiene and 1,5,9-cyclododecatriene, polymers and copolymers that still contain epoxidizable double bonds, based for example on polybutadiene, polyisoprene, butadiene-styrene copolymers, divinylbenzene, dicyclopentadiene and unsaturated polyesters, and furthermore epoxidation products from olefins that are accessible by Diels-Alder addition and are then converted by epoxidation with a per-compound into polyepoxides or from compounds that contain two cyclopentene or cyclohexene rings linked via bridging atoms or bridging atomic groups. Polymers of unsaturated mono-epoxides should also be mentioned, for example those from methacrylic acid glycidyl ester or allyl glycidyl ether.

According to the invention, the following polyepoxide compounds or their mixtures are preferably used as component b): polyglycidyl ethers of polyhydric phenols, especially of bisphenol A; polyepoxide compounds based on aromatic amines, especially bis(N-epoxypropyl)aniline, N,N'-dimethyl-N,N'-di-epoxypropyl-4,4'-diaminodiphenylmethane and N-di-epoxypropyl-4-aminophenylglycidyl ether; polyglycidyl esters from cycloaliphatic dicarboxylic acids, especially hexahydrophthalic acid diglycidyl ester and polyepoxides from the reaction product of n moles hexahydrophthalic anhydride and 1 mole of a polyol with n hydroxyl groups (n=a whole number from 2 to 6), especially 3 moles hexahydrophthalic anhydride and 1 mole 1,1,1-trimethylolpropane, and 3,4-epoxycyclohexylmethane 3,4-epoxycyclohexanecarboxylate.

Liquid polyepoxides or low-viscosity diepoxides, such as bis(N-epoxypropyl)aniline or vinylcyclohexenediepoxide, can be used. In particular cases this can further reduce the viscosity of already liquid polyepoxides or convert solid polyepoxides into liquid mixtures.

The non-latent catalysts $c_1$) according to the invention are tertiary amines which are known and described in U.S. Pat. No. 5,084,544 (believed to correspond to German Offenlegungsschrift 3,904,156), the disclosure of which is herein incorporated by reference.

The latent catalysts $c_2$) according to the invention are
i) tertiary or quaternary ammonium salts formed by acid esters, active in alkylation, of organic phosphonic acids or of phosphoric acid or ii) boron trihalide-tertiary amine complexes.

These catalysts are also known and are described in U.S Pat. No. 4,728,676 (believed to correspond to German Offenlegungsschrift 3,600,764), the disclosure of which is herein incorporated by reference. Preferred latent catalysts are:

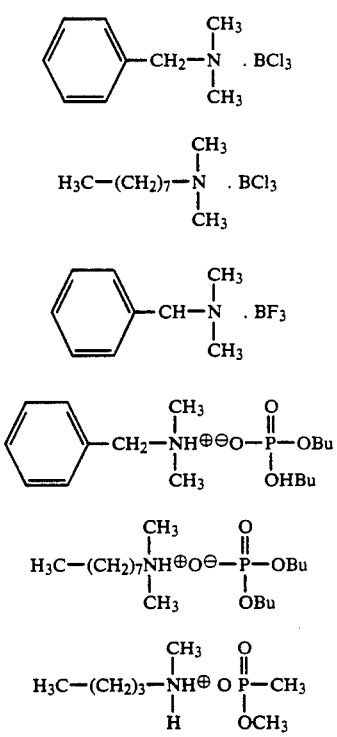

(Bu = Butyl)

The latent catalyst is used in an amount of 0.1–3% by weight—based on the total mixture.

Further processing aids and additives d) that can optionally be used simultaneously include for example fillers, pigments or plasticizers. Suitable fillers include, e.g., quartz powder, chalk or aluminum oxide, graphite, conductive black or SiC. Suitable pigments include, e.g., titanium dioxide, iron oxide or organic pigments such as phthalocyanine pigments. Suitable plasticizers include, e.g., dioctyl phthalate, and tributyl or triphenyl phosphate.

It is also possible to simultaneously use soluble colorants or reinforcing materials such as e.g. glass fibers or glass cloths or cloths of carbon fibers and mineral fibers.

The invention is further illustrated but is not intended to be limited by the following examples in which all parts and percentages are by weight unless otherwise specified.

EXAMPLES

Example 1

80 parts of a low-viscosity polyisocyanate mixture based on diphenylmethane diisocyanate having an NCO group content of 33% by weight, 20 parts of a bisphenol A diglycidyl ether having an epoxy value of 0.58 to 0.59, 1 part of the Lewis salt from $BCl_3$ and dimethyloctylamine and 0.5 part of methyldibenzylamine were carefully mixed. 150 parts of translucent fused quartz powder were stirred into this material and the mixture mixed until a homogeneous, uniformly wetted mass was formed. After storage for 3 days in a closed vessel, the solidified material was ground and stored with exclusion of moisture. The powder so obtained was pressed at a temperature of 200° C. and a pressure of 15 bar/cm$^2$ to sheets (4mm thick) which were then heat-treated for a further 16 hours at 200° C. The sheets had a modulus of elasticity of 7933 N/mm$^2$ and a Martens deflection temperature of 240° C.

Example 2

80 parts of the isocyanate used in Example 1, 20 parts of a bisphenol A diglycidyl ether having an epoxy value of 0.58 to 0.59, 1 part of the Lewis salt from $BCl_3$ and dimethyloctylamine and 0.4 part of methyldibenzylamine were carefully mixed and stored in a closed vessel for 4 days. The mass, which was gelled, was ground to a powder and stored with protection from moisture.

In a powder mixer, 35 parts of this powder, 20 parts of dolomite (Microdol ® of Nowegian Tale), 25 parts of ground glass fibers (new MF 7901 of Bayer AG, Germany) and 20 parts of short-cut glass fibers (CS 7915 of Bayer AG, Germany) with a length of 3 mm were carefully mixed. This material was pressed at a temperature of 200° C. and a pressure of 15 bar/cm$^2$ to sheets (4 mm thick), which were then after-baked at 200° C. for a further 16 hours. The sheets had a flexural strength of 125 N/mm$^2$, a modulus of elasticity of 10,700 N/mm$^2$ and an impact resistance of 14 kJ/m$^2$.

Example 3

80 parts of the isocyanate of Example 1, 20 parts of a bisphenol A diglycidyl ether having an epoxy value of 0.58 to 0.59, 1 part of the Lewis salt from $BCl_3$ and dimethyloctylamine and 0.6 part of methyldibenzylamine were carefully mixed. Into this mixture were dipped glass cloths with an area of 210 mm × 330 mm and a weight per unit area of about 200 g/m$^2$, each piece absorbing about 50 parts of the mixture. These prepreas were stored, separated by film and with exclusion of atmospheric moisture. At a given time, the sheets were pressed, 8 per layer, at 200° C. and a pressure of about 5 bar/cm$^2$.

For the moldings, which were about 1.6 mm thick, there was no difference in the mechanical properties at aging times of 6 days and 30 days.

|  | 6 days | 30 days |
|---|---|---|
| Modulus in flexure (N/mm$^2$) | 21215 | 21892 |
| Flexural strength (N/mm$^2$) | 428 | 434 |
| Extreme fiber extension ($\eta$) | 2.4 | 2.3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermosetting reaction resin mixture prepared by reacting
   a) at least one organic polyisocyanate, with
   b) at least one organic compound, containing at least two epoxide groups, in an amount corresponding to an equivalent ratio of isocyanate groups to epoxide groups of from 1.2:1 to 70:1, in the presence of
   c) a catalyst mixture consisting of
      c$_1$) from 0.1 to 1.0% by weight based on the weight of the total mixture of a non-latent catalyst which is a tertiary amine, and
      c$_2$) a thermally latent catalyst selected from the group consisting of i) tertiary or quaternary ammonium salts formed from acid esters of organic phosphonic acids or phosphoric acid, said esters being active in alkylation, and ii) boron trihalide-tertiary amine complexes, and
   d) optionally, further processing aids and additives, wherein the combination of the two catalysts c$_1$) and C$_2$) gives rise to a B-stage resin that i) is solid and storage-stable at room temperature and ii) can be converted at any time into a final crosslinked state by the application of heat.

2. A grindable, fusible and soluble resin according to claim 1, additionally containing fillers, colorants, processing aids and additives.

3. Liquid resins according to claim 1, characterized in that they are converted, optionally after adding fillers, colorants, processing aids and additives, to storage-stable pourable materials and later processed to moldings.

4. Liquid resins according to claim 1, characterized in that, applied to supporting materials, they react at room temperature to the B-stage and are later pressed to moldings.

* * * * *